UNITED STATES PATENT OFFICE.

CARL V. PETRAEUS, OF CAMDEN, NEW JERSEY.

MANUFACTURE OF ALUMINA BY PAPER-MILL SLUDGE.

SPECIFICATION forming part of Letters Patent No. 312,894, dated February 24, 1885.

Application filed October 13, 1884. (No specimens.)

*To all whom it may concern:*

Be it known that I, CARL V. PETRAEUS, of the city and county of Camden, in the State of New Jersey, have invented certain new and useful Improvements in the Utilization of Waste Soda-Liquor from Paper-Mills, of which the following is a full, clear, and exact specification.

In manufacturing paper-pulp from wood, straw, and similar material containing cellulose, the material is boiled in a solution of caustic alkali—for economical reasons, caustic soda. When the boiling is done, the cellulose of the material is left insoluble in a nearly pure state, while the soda contains in solution humic and resinous matter and other impurities. The solution is separated from the cellulose, and is now boiled down. Sometimes it is only boiled down to concentrated tarry mass and used for boiler compound; but as a general thing it is boiled down in reverberatory furnaces, and when all water is driven out it easily catches fire, and the organic matter is burned out, so that a grayish-black residue of carbonate of soda and carbon is left behind. This mass is leached and made into caustic soda to be used over again. It has been proposed to mix into the mass sulphate of soda and lime, thus producing a fresh quantity of soda-ash. At the same time the liquor is boiled down and burned; but though this works very well, it has proved impractical, as in reality increasing the cost more than the extra soda-ash is worth. I have, however, discovered that if an impure aluminous material—such as wocheinite or bauxite containing alumina, oxide of iron, silicates, free silex, titanic acid, &c., in a finely ground state—be mixed in with the liquor, the process of boiling down and burning the soda-liquor may be combined with the refining of such aluminous material, so that a pure alumina, free of iron, can be produced. I introduce the aluminous material either in the weak liquor, or after it has been boiled down some, and I allow this mixture to pass through the furnace in the same manner as if liquor alone were used. I prefer to add a quantity of slaked lime together with the aluminous material, as I find always more or less alumina and soda rendered insoluble as double silicates, and the amount of alumina and soda thus lost is materially diminished by the lime. Still, I do not consider this essential to the process. After the mass is drawn out of the furnace it contains, soluble in water, a mixture of carbonate of soda and aluminate of soda. This mass is leached, and of the solution the alumina is produced by the well-known process, of which the most economical is the precipitation of the alumina by carbonic acid. The alumina is now separated from the carbonate of soda by decantation or filtration, and the carbonate of soda may be made caustic in the usual manner, while the alumina free of iron may be manufactured into alum, or may be used otherwise.

The amount of aluminous material to be used depends somewhat upon the composition of the material, as the silex is likely to render part of the soda insoluble and give occasion to loss.

The bauxite I have used contains about twelve parts silica, five parts titanic acid, sixty parts alumina, and two and one-fourth parts oxide of iron. By boiling down and burning waste liquor with this I have been able to produce in solution a disodic hydric aluminate, ($AlO_3 Na_2H$,) thus using one hundred and three parts alumina for each sixty-two parts soda ($Na_2O$) in the solution; but I consider this amount rather too high on account of loss in soda, and I prefer to use no more alumina than necessary to form trisodic aluminate, ($Al O_3Na_3$,) or one hundred and three parts alumina for each ninety-three parts soda ($Na_2O$) in solution. There may be cases where it would be better to use still less alumina. Any amount less than one hundred and three parts alumina to sixty-two parts soda may be used, while more is a waste. If small amounts of aluminous material are used, it is not necessary to use any lime; but with the larger amounts the lime assists the process very much when not used in larger quantities than fifty-six parts to one hundred and three parts alumina.

I am aware that pure alumina has been made from ferruginous aluminous material by various processes, thus by heating bauxite with sulphate of soda or chloride of sodium and steam—a process that is impractical because of the intensely high heat required. It has been made by heating bauxite with sulphate of soda and carbon, which process is impractical because a sulphuret of iron and sodium is formed, which enters the solution, and when alumina is precipitated is also decomposed, so as to precipitate the iron and render the alumina impure. The only process by which pure alumina practically has been made from bauxite or ferruginous alumina is by boiling the raw material with caustic soda, or by roasting it with carbonate of soda, and the former has even great difficulties.

Having thus described my invention, what I claim as new, and desire to secure by Letters Patent, is—

The manufacture of alumina free of iron from ferruginous aluminous material by mixing such impure material with the spent soda-liquor from manufacture of wood or straw paper-pulp, and evaporating and burning this, as described.

C. V. PETRAEUS.

Witnesses:
D. SOMERS RISLEY,
R. A. WILLS.